(12) United States Patent
Duehring

(10) Patent No.: US 8,261,859 B2
(45) Date of Patent: Sep. 11, 2012

(54) MOTOR POWERED BICYCLE TRAILER WITH INTEGRAL HITCH FORCE METERING

(75) Inventor: William K. Duehring, Newport Beach, CA (US)

(73) Assignee: Felt Racing, LLC, Irvine, CA (US)

( * ) Notice: Subject to any disclaimer, the term of this patent is extended or adjusted under 35 U.S.C. 154(b) by 159 days.

(21) Appl. No.: 12/855,138

(22) Filed: Aug. 12, 2010

(65) Prior Publication Data

US 2012/0037435 A1 Feb. 16, 2012

(51) Int. Cl.
*B62M 7/14* (2006.01)
(52) U.S. Cl. .......................................... 180/11; 280/204
(58) Field of Classification Search .................. 180/15, 180/14.2, 14.1, 14.4, 16, 205, 206; 280/204, 280/202
See application file for complete search history.

(56) References Cited

U.S. PATENT DOCUMENTS

| | | | | |
|---|---|---|---|---|
| 3,312,299 A | * | 4/1967 | Kuecker | 180/11 |
| 4,461,365 A | | 7/1984 | Diggs | |
| 5,240,266 A | * | 8/1993 | Kelley et al. | 280/204 |
| 5,829,771 A | * | 11/1998 | Hsu | 280/204 |
| 6,056,306 A | * | 5/2000 | Rust et al. | 280/204 |
| 6,663,126 B2 | * | 12/2003 | Britton et al. | 280/204 |
| 6,725,955 B2 | * | 4/2004 | Bidwell | 180/11 |
| 7,000,933 B2 | * | 2/2006 | Arling et al. | 280/204 |
| 8,056,657 B1 | * | 11/2011 | Duehring | 180/11 |
| 2003/0193156 A1 | * | 10/2003 | Norris | 280/204 |
| 2004/0173988 A1 | * | 9/2004 | Britton et al. | 280/204 |
| 2007/0290476 A1 | * | 12/2007 | Chuang | 280/204 |
| 2008/0023234 A1 | * | 1/2008 | Wang | 180/14.2 |
| 2010/0065344 A1 | * | 3/2010 | Collings, III | 180/2.1 |
| 2011/0253463 A1 | * | 10/2011 | Smith | 180/11 |

* cited by examiner

*Primary Examiner* — Tashiana Adams
(74) *Attorney, Agent, or Firm* — Stetina Brunda Garred & Brucker

(57) ABSTRACT

A self-propelled trailer may be attached to a bicycle. The speed of the trailer is adjusted based on a signal from a force gauge which indicates whether the bicycle is pulling the trailer or the trailer is pushing the bicycle. In the former situation, the force gauge indicates a tensile load, and in the latter situation, the force gauge indicates a compressive load. Based on the feedback from the force gauge, the speed of the motor attached to the self-propelled trailer is adjusted so that the trailer and bicycle are moving at the same speed or the bicycle is pulling the trailer.

16 Claims, 2 Drawing Sheets

MOTOR POWERED BICYCLE TRAILER WITH INTEGRAL HITCH FORCE METERING

CROSS-REFERENCE TO RELATED APPLICATIONS

Not Applicable

STATEMENT RE: FEDERALLY SPONSORED RESEARCH/DEVELOPMENT

Not Applicable

BACKGROUND

The present invention relates to a self-propelled trailer for a bicycle.

Power trailer arrangements for human power transport vehicles have been developed over the years. By way of example and not limitation, U.S. Pat. Nos. 6,725,955 and 4,461,365 disclose such examples. The problem with such self-propelled trailers is the inherent instability in this design. For example, if the self-propelled trailer is moving forward while the bicyclist is not pedaling, then the self-propelled trailer is pushing the bicycle forward. In this situation, there is a tendency for the trailer and bicycle to jack knife. The rider could fall and hurt him or herself.

Accordingly, there is a need in the art for an improved self-propelled trailer.

BRIEF SUMMARY

The self-propelled trailer discussed herein addresses the needs discussed above, discussed below and those that are known in the art.

The self-propelled trailer has a feedback mechanism in which a motor of the self-propelled trailer speeds up or slows down so that the bicycle is always pulling the self-propelled trailer. The feedback mechanism is a force gauge that is disposed between the bicycle and the self-propelled trailer. For example, the force gauge may be incorporated into a hitch arm of the trailer.

The force gauge may determine whether the trailer is pushing the bicycle or whether the bicycle is pulling the trailer. By way of example and not limitation, if the force gauge indicates a tensile load, then the bicycle is pulling the trailer. If the force gauge indicates a compressive load, then the trailer is pushing the bicycle. When the force gauge indicates a compressive load, then an unstable situation arises. The bicycle and trailer may jack knife. To alleviate or mitigate such risk, the controller adjusts the motor when the controller receives a signal from the force gauge indicating a compressive load. For example, the controller may slow down the motor. The controller adjusts the speed of a motor of the self-propelled trailer until the force gauge indicates a neutral load or slightly tensile load. It is also contemplated that the controller may brake the motor to ensure that the bicycle is always pulling the trailer and the force gauge indicates a tensile load.

The controller may also receive the magnitude of the tensile load from the force gauge. If the magnitude of the tensile load is within an allowable range (i.e., slightly tensile), then the controller does not adjust the speed of the motor. If the magnitude of the tensile load exceeds the allowable range, then the controller adjusts the speed of the motor to bring the tensile load sensed by the force gauge back within the allowable range. The allowable range is adjustable by the rider More particularly, a trailer for a human powered vehicle is disclosed. The trailer may comprise a storage platform (e.g., flatbed or baby carriage, etc.); a wheeled suspension system attached to the storage platform for rolling the storage platform; a motor coupled to the wheeled suspension system for providing power to the wheeled suspension system; and a force metering device disposed intermediate the vehicle and the wheeled suspension system.

During operation, the motor provides less power to the wheeled suspension system when the force metering device indicates a compressive load between the vehicle and the wheeled suspension system. Also, the motor provides more power to the wheeled suspension system when the force metering device indicates a tensile load between the vehicle and the wheeled suspension system.

The trailer may also further comprise a boom attached to the storage platform. A distal end portion of the boom may have a ball configuration wherein the force metering device is disposed between the ball and the storage platform. A socket may be attached to a rear dropout of the vehicle such as a bicycle. The socket may receive the ball of the boom to provide vertical and horizontal freedom of movement to the trailer as the trailer is being guided behind the vehicle over uneven terrain.

The trailer may also further comprise a battery in communication with the motor; and a controller in electrical communication with the force metering device and the motor. The controller may be operative to control an amount of power supplied to the motor by the battery.

The human powered vehicle discussed herein may be a bicycle.

A method of towing a trailer behind a human powered vehicle is also disclosed. The method may comprise the steps of connecting the trailer to the vehicle; pedaling the vehicle in the forward direction; measuring a compressive load or a tensile load between the vehicle and the trailer, a tensile load indicative that the trailer is pushing against the vehicle, a compressive load indicative that the vehicle is pulling the trailer; increasing power to a motor when the force metering device indicates a tensile load; and decreasing power to the motor when the force metering device indicates a compressive load.

The method may also further comprise the step of braking the motor to achieve a tensile load reading by the force metering device. The method may also further comprise the step of regenerating the battery when braking the motor.

The decreasing step may include the step of decreasing power to within an allowable tensile load range.

In the method, the acceptable tensile load range may be adjusted by the rider. Also, the vehicle may be a bicycle.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
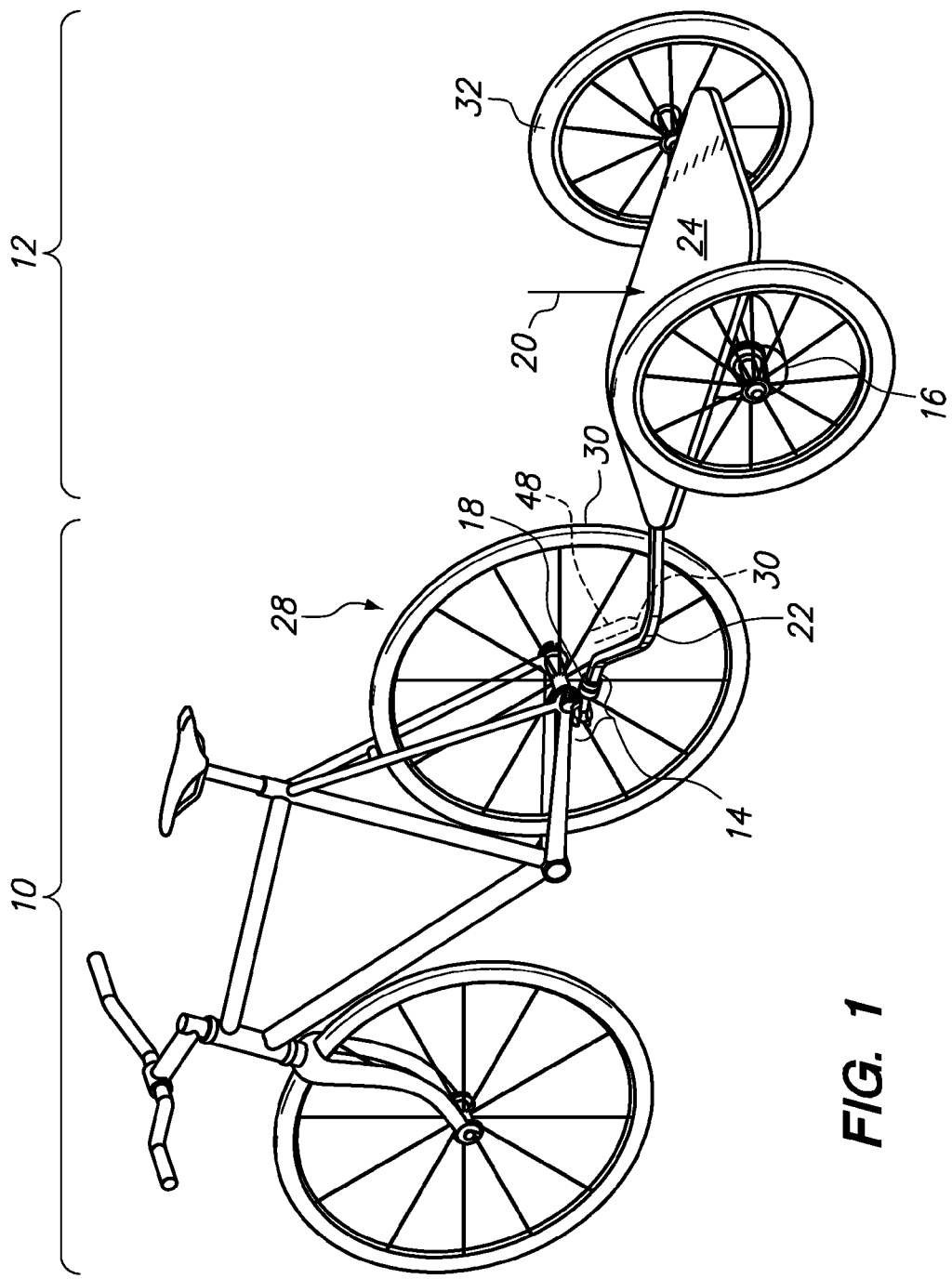
FIG. 1 is a perspective view of a bicycle with a self-propelled trailer.

Referring now to the drawings, a bicycle 10 with a trailer 12 is shown. The trailer 12 can be removably attached to the bicycle 10 by way of a hitch 14. The trailer 12 is self propelled under the power of a motor 16 (see FIG. 2) and mechanically coupled to the wheels 32 of the trailer 12. The speed of the motor 16 is adjusted based upon feedback from a force gauge 18 which may be located near the hitch 14. When the force gauge 18 indicates a compressive load, the speed of the motor 16 is reduced to slow down the trailer 12 until the force gauge 18 indicates a neutral load or a slightly tensile load. Conversely, when the force gauge 18 indicates a significant tensile load, the motor 16 speeds up until the force gauge 18 indicates a neutral load or a slightly tensile load. In this manner, the rider propels the bicycle 10. The motor 16 propels the trailer 12. The self propelled trailer 12 does not push the bicycle 10. When the force gauge 18 indicates a neutral load between the bicycle 10 and the trailer 12, the system is working optimally. The rider does not exert energy to pull the trailer 12. The trailer 12 is propelled forward under the power of the motor 16. The system is predominantly neutral.

It is contemplated that a negligible or slight tensile load may be allowable on the force gauge without having to adjust the speed of the motor 16. A slight tensile load is preferred since the tensile load indicates that the bicycle 10 is pulling the trailer 12. If the force gauge 18 senses a neutral load or a slight tensile load, then the motor 16 does not compensate since the situation where the bicycle 10 is pulling the trailer is preferred. The allowance for the slight tensile load accommodates variations in power to the motor, uneven terrain that may cause the force gauge 18 to read varying levels of tensile loads and even a compressive load, among other factors. The tolerance of the tensile load on the force gauge 18 that would cause the motor 16 to adjust speed may be adjusted by the rider or at the factory. If the force gauge 18 senses a compressive load, then the trailer 12 would be pushing the bicycle 10. This situation is unstable and may cause the bicycle 10 and trailer 12 to jack knife. The motor's 16 speed is compensated to stabilize the situation. The motor powered bicycle trailer 12 with integral hitch force metering provides a stable platform that can aid the rider in pulling the trailer 12 and a load 20 loaded thereon from point A to point B.

More particularly, referring now to FIG. 1, the trailer 12 may have a hitch arm 22 that extends from and may be rigidly connected to the loading area 24. The loading area 24 is shown as a flatbed. However, it is also contemplated that the loading area 24 may be configured as a child seat, a trailer with sides or a covered box for hauling an object in the loading area 24. Other configurations are also contemplated. The flatbed version is shown for the purposes of simplicity and not for limitation.

Figure 2:
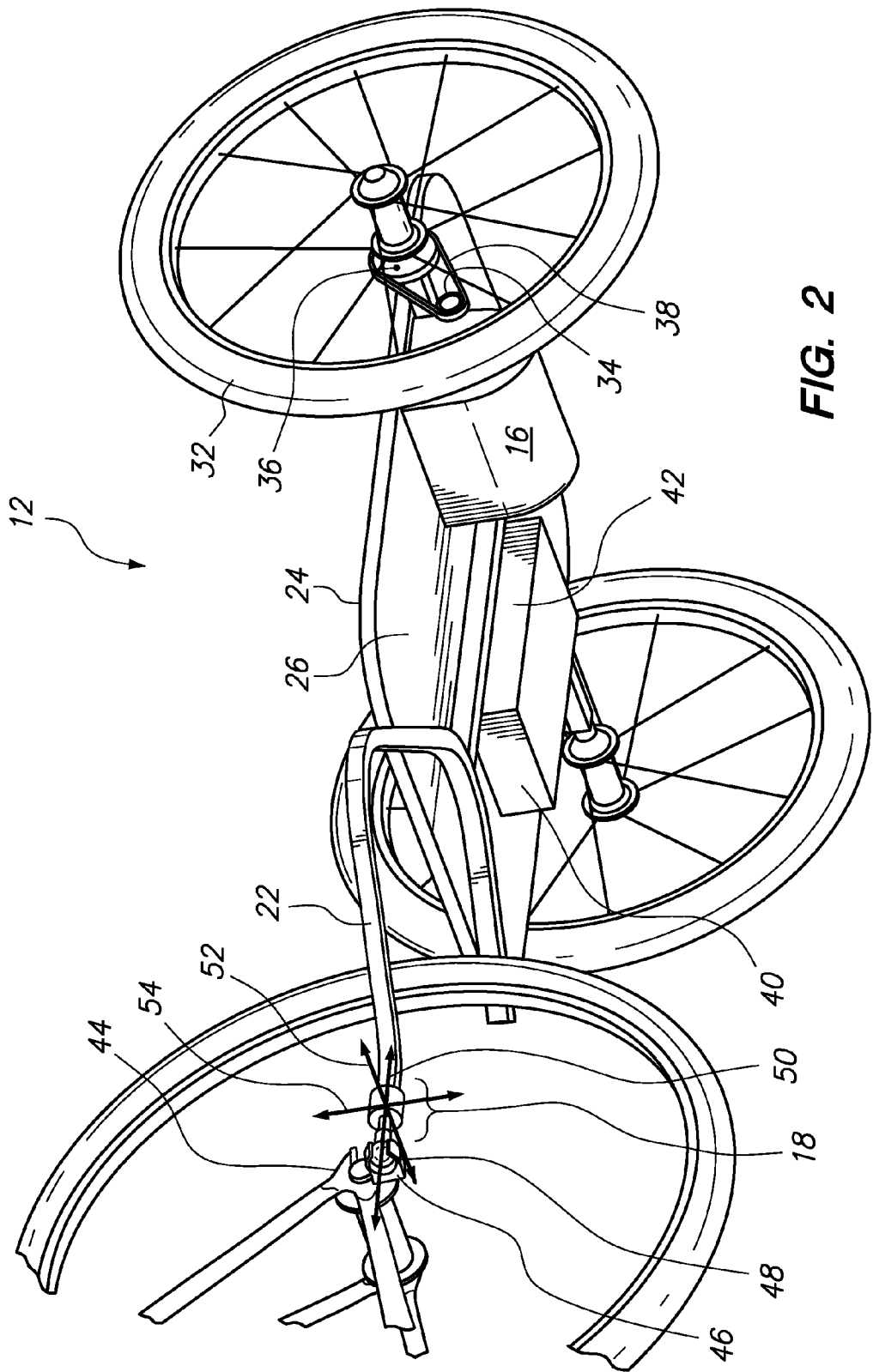
FIG. 2 is a bottom perspective view of the self-propelled trailer shown in FIG. 1.

Referring now to FIG. 2, the hitch arm 22 may be attached to the underside 26 of the loading area 24 so that things or objects may be loaded on top of the loading area 24. The hitch arm 22 may extend laterally outward so that the hitch arm 22 does not contact the rear wheel 28 when the rider is moving straight forward or turning to the right (see hidden lines 48 in FIG. 1). The hitch arm 22 extends laterally outward toward the left so that as the rider turns toward the right, the back edge 30 of the rear wheel 28 is received into the space created by the bend in the hitch arm 22 (see hidden lines 48, 30 in FIG. 1). The hitch arm 22 may be attached to the loading area 24 in any manner known in the art or developed in the future. In the illustration shown in FIGS. 1 and 2, the hitch arm 22 is located on the left side of the bicycle 10. It is also contemplated that the hitch arm 22 be located on the right side of the bicycle 10.

The motor 16 may be mounted to the underside 26 of the loading area 24. The motor 16 may be mechanically coupled to the wheels 32 of the trailer 12. By way of example and not limitation, the motor 16 may have a spindle with a gear 34. The wheels 32 may be attached to a common axle with a second gear 36 attached to the axle. A V-belt or other chain mechanism 38 may be attached to the first and second gears 34, 36 to synchronize the first and second gears 34, 36. As the motor 16 rotates the gear 34, power is transferred to gear 36 and rotates the wheels 32 of the trailer 12.

A battery 40 may also be mounted to the underside 26 of the loading area 24. The battery 40 provides power to the motor 16. In addition to the battery 40, a controller 42 may also be mounted to the underside 26 of the trailer 12. The controller 42 may regulate the amount of power supplied by the battery 40 to the motor 16. The controller 42 may increase the amount of power to the motor 16 to increase the speed of wheels 32. Conversely, the controller 42 may decrease the amount of power supplied by the battery 40 to the motor 16 to decrease the speed of the wheels 32. The controller 42 may be in electrical communication with the force gauge 18. The electrical communication may be wireless or wired. If wired, the wired connection may be routed through the hitch arm 22. The controller 42 may receive a signal from the force gauge 18 which in turn controls (i.e., increases or decreases) the amount of power being directed to the motor 16.

The force gauge 18 may measure the force in three different axes, namely, axial (e.g., compressive or tensile), horizontal and vertical. The axial direction is shown in FIG. 2 and identified as reference numeral 50. The horizontal and vertical directions are shown by arrows 52, 54, respectively. The magnitude of force in these three directions may be communicated to the controller 42 which can determine the amount of power to be delivered to the motor 16 by the battery 40. The amount of power delivered to the motor 16 by the battery 40 may be anywhere between zero to its maximum output in order for the force gauge 18 to sense a neutral force (i.e., zero) or a slightly tensile force. By way of example and not limitation, the amount of power delivered to the motor 16 by the battery 40 may be increased or decreased depending on whether the force gauge 18 measures a tensile or compressive load in the axial direction, as discussed herein. Additionally, the controller 42 can send differing amounts of power to the motor 16 depending on whether the vehicle 10 and trailer 12 are being ridden over a bumpy surface. The bumpy surface causes the vertical direction of the force gauge 18 to measure excessive forces. The axial load of the force gauge may be a result of the uneven terrain and not due to the trailer 12 pushing the bicycle 10 creating an unstable situation or the motor 16 being too slow thereby placing too great of a load on the rider's leg. The controller can accommodate the bumpy surface or uneven terrain by allowing for a wider range of tensile or compressive load in the axial direction before adjusting the amount of power delivered to the motor 16 by the battery 40. Additionally or alternatively, the horizontal direction of the force gauge 18 may indicate that the bicycle 10 is turning left or right. In this instance, when the force gauge measures a force in the horizontal direction to indicate turning of the bicycle 10, the controller 42 may send less power to the motor 16 to slow down the trailer 12. Instead of using the force gauge 18 to measure the horizontal force changes, an inclinometer may be installed in order to determine the angular relationship between the hitch arm 22 and the bicycle 10. When the inclinometer indicates an angular change which indicates that the bicycle is turning left or right, the controller 42 may receive a signal from the inclinometer and slow down or reduce power to the motor 16 to slow down the trailer 12. It is contemplated that the force gauge 18 may measure force only in the axial direction, the axial direction in combination with the horizontal and/or vertical direction for use in controlling power to the motor.

The hitch arm 22 may be attached to the rear dropout 44 of the bicycle 10. In particular, a socket 46 may be attached to the rear dropout 44. The socket 46 is operative to receive a ball 48. The ball 48 connection allows the trailer 12 to move up, down, left and right and also pitch yet maintain connection between the hitch arm 22 and the bicycle 10. The force gauge 18 may be connected between the ball 48 and the elongate arm of the hitch arm 22. The socket 46 is shown as being attached to the non-drive side rear dropout 44. It is also contemplated that the hitch arm 22 may be located on the opposite side. In this situation, the socket 46 may be attached to the drive side rear dropout 44. The socket 46 and ball 48 embodiment disclosed herein is shown and described for the purposes of illustration and not limitation. Any other attachment methods currently known in the art or developed in the future are also contemplated.

Referring back to FIG. 1, during operation, generally, the bicycle 10 is propelled forward by the rider. The trailer 12 is propelled by the motor 16. The force gauge 18 provides information or signals to the controller 42. Based on the signals from the force gauge 18, the controller 42 adjusts (i.e., increases or decreases) the amount of power being delivered to the motor 16. The bicycle 10 by virtue of it being connected to the trailer 12 guides the trailer 12 left or right. The ball 48 and socket 46 connection allows the bicycle 10 and trailer 12 to traverse over uneven terrain.

When too much power is delivered to the motor 16, the trailer 12 tends to push the bicycle 10 forward and may cause the bicyclist to fall off of the bicycle 10 or cause the bicycle 10 and trailer 12 to jack knife. In this situation, the force gauge 18 would register a compressive load. The force gauge 18 may send a signal to the controller 42 signifying that a compressive load is being experienced at the force gauge 18. If the trailer 12 continues to push the bicycle 10, the trailer 12 may cause the bicycle 10 to jack knife and the rider will fall down. To mitigate against such situation, the controller 42 may reduce the amount of power being delivered to the motor 16 to slow down the trailer 12. The amount of power delivered to the motor 16 is reduced until the force gauge 18 indicates a neutral load or a slightly tensile load. Also, the controller may brake the motor until the force gauge 18 indicates a neutral or a slightly tensile load. When a neutral load is measured by the force gauge 18, the bicycle 10 and the trailer 12 are traveling at exactly the same speed. Due to bumps in the road and unlevel terrain, the amount of force experienced by the force gauge 18 may be neutral only momentarily. To account for such deviations or variations in road terrain and operation, the controller 42 may send less power to the motor 16 or further brake the motor to further slow down the trailer 12. At this point, a tensile load is experienced at the force gauge 18. Nonetheless, such situation is stable since the bicycle 10 is pulling the trailer 12 and not being pushed by the trailer 12. The allowable amount to which the force gauge 18 may experience a tensile load is determined by the capability of the motor 16, controller 42, battery 40 and the force gauge 18. If the system can react fast enough to adjust for terrain variations and pedaling variations of the rider, then a smaller allowable tensile load is achievable. The system can react within time so that the force gauge 18 does not measure a compressive load for a significant period of time which would cause the bicycle 10 to jack knife or become unstable.

The motor 16 provides supplemental power to move the trailer 12. The rider does not have to expend the energy to move the trailer 12 or load 20. When the rider is climbing uphill, the trailer 12 tends to roll backward. The force gauge 18 may register a significant tensile load and send a signal to the controller 42. The controller 42 sends additional power to the motor 16 from the battery 40. The additional power speeds up the wheels 32 of the trailer 12 until the force gauge 18 senses a neutral or slightly tensile load. Once the rider crests the peak of the hill, the rider proceeds downhill. At this time, the trailer 12 tends to move forward faster due to gravity. The rider may apply the brakes of the bicycle 10 so that the force gauge 18 registers a compressive load. In this instance, the controller 42 may reduce the amount of power being sent to the motor 16 to reduce the speed of the wheels 32 of the trailer 12. The trailer 12 may be slowed down by the motor 16 so that the bicycle 10 is still pulling the trailer 12. Even during downhill riding, the trailer 12 is being pulled by the bicycle 10.

It is also contemplated that the trailer 12 may be equipped with a brake. When the force gauge 18 senses a compressive load, the controller 42 may activate the brake to slow down trailer 12. This may be necessary when the rider quickly stops or when the rider is riding downhill. It is also contemplated that the battery 40 may be regenerated or recharged when braking the motor 16.

The above description is given by way of example, and not limitation. Given the above disclosure, one skilled in the art could devise variations that are within the scope and spirit of the invention disclosed herein, including various ways of attaching the trailer 12 to the bicycle 10. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A trailer for a human powered vehicle, the trailer comprising:
   a storage platform;
   a wheeled suspension system attached to the storage platform for rolling the storage platform;
   a motor coupled to the wheeled suspension system for providing power to the wheeled suspension system;
   a force metering device disposed intermediate the vehicle and the wheeled suspension system for sensing either a tensile or compressive load between the vehicle and the wheeled suspension system;
   a controller in communication with the force metering device and the motor to regulate an amount of power sent to the motor;
   wherein the controller regulates the power to the motor to maintain a sensed tensile load at the force metering device.

2. The trailer of claim 1 wherein the controller provides more power to the motor when the force metering device indicates a tensile load outside of an allowable tensile load range.

3. The trailer of claim 1 wherein the storage platform is a flatbed or a baby carriage.

4. The trailer of claim 1 further comprising:
   a boom attached to the storage platform, a distal end portion of the boom having a ball configuration wherein the force metering device is disposed between the ball and the storage platform;
   a socket attachable to a rear dropout of the vehicle, the socket operative to receive the ball of the boom to provide vertical and horizontal freedom of movement to the trailer as the trailer is being guided behind the vehicle or uneven terrain.

5. The trailer of claim 1 further comprising a battery in communication with the motor.

6. The trailer of claim 1 wherein the human powered vehicle is a bicycle.

7. A method of towing a trailer behind a human powered vehicle, the method comprising the steps of:
- connecting the trailer to the vehicle;
- moving the vehicle in the forward direction;
- sensing a compressive load or a tensile load between the vehicle and the trailer, a tensile load indicative that the trailer is pushing against the vehicle, a compressive load indicative that the vehicle is pulling the trailer;
- increasing power to a motor when the force metering device indicates the tensile load outside of an allowable tensile load range;
- maintaining power to the motor when the force metering device indicates the tensile load within the allowable tensile load range;
- decreasing power to the motor when the force metering device indicates compressive load.

8. The method of claim 6 further comprising the step of braking the motor to achieve a tensile load reading by the force metering device.

9. The method of claim 7 further comprising the step of regenerating the battery when braking the motor.

10. The method of claim 7 wherein the decreasing step includes the step of decreasing power to within the allowable tensile load range.

11. The method of claim 9 wherein the allowable tensile load range is adjusted by the rider.

12. The method of claim 7 wherein the vehicle is a bicycle.

13. The method of claim 12 wherein the moving step includes the step of pedaling the bicycle.

14. The trailer of claim 1 further comprising a brake in communication with the force metering device, the brake being operative to slow down the trailer when the force metering device senses the compressive load.

15. The trailer of claim 1 further comprising an adjustment device in communication with the controller for adjusting an allowable tensile load range.

16. The trailer of claim 1 wherein the controller sends less power to the motor when the force metering device indicates a compressive load between the vehicle and the wheeled suspension system.

* * * * *